Aug. 25, 1970     V. R. KAUFMAN     3,525,201
LAWN MOWER AND LAWN BRUSH MACHINE
Filed Jan. 3, 1969
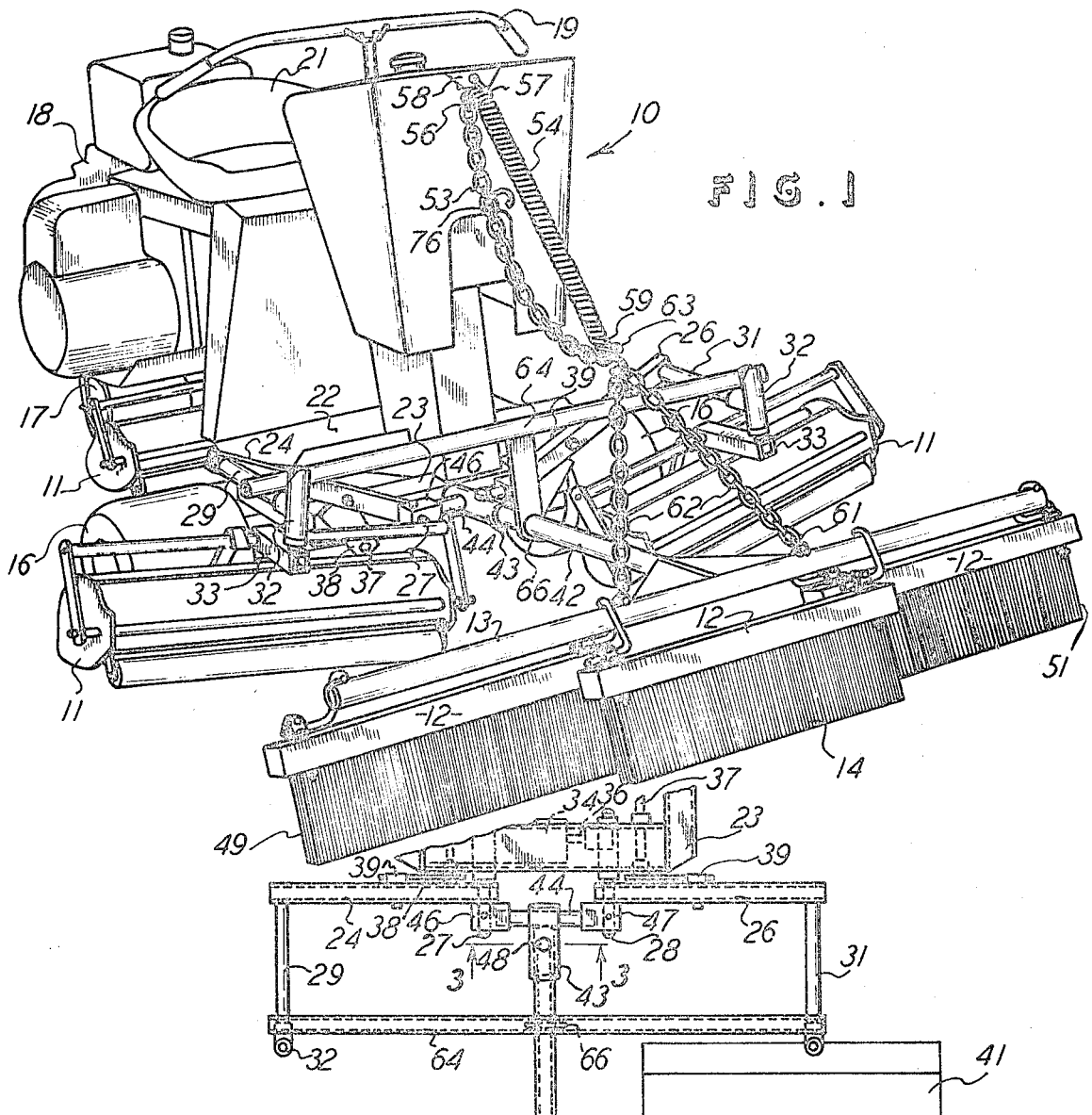
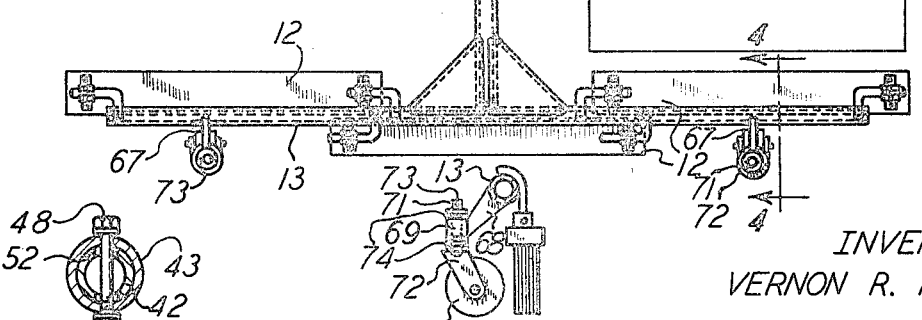
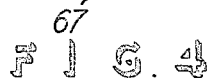
INVENTOR:
VERNON R. KAUFMAN
BY: *Arthur J. Hansmann*
ATTORNEY

United States Patent Office 3,525,201
Patented Aug. 25, 1970

3,525,201
LAWN MOWER AND LAWN BRUSH MACHINE
Vernon R. Kaufman, Racine, Wis., assignor, by mesne assignments, to Jacobsen Manufacturing Company, Racine, Wis., a corporation of Delaware
Filed Jan. 3, 1969, Ser. No. 788,865
Int. Cl. A01d 75/30
U.S. Cl. 56—7
15 Claims

ABSTRACT OF THE DISCLOSURE

A lawn mower and lawn brush machine having a self-propelled tractor with a plurality of lawn mowers pivotally mounted on the tractor for raising and lowering the mowers. Lawn brushes are disposed forwardly of the mowers for brushing the grass before it is mowed. The brushes are connected to the tractor to be pivoted up and down, and a lifter is operative between the mowers and the lawn brushes such that upon raising the mowers the lawn brushes are also raised. Support means is provided on the brush means for upwardly supporting the brushes and for placing the brushes onto the grass with a selectable amount of brushing force.

---

This invention relates to a lawn mower and lawn brush machine. It is common knowledge in the mowing art that lawn brushes are provided forwardly of lawn mowers to brush the grass before it is mowed. This arrangement is commonly used on golf course greens so that the grass will actually be brushed or groomed to have it stand up before it is mowed. Further, these prior mowing and brushing machines commonly employ a single brush and a single mower, and the brush is sometimes raised and lowered relative to the mower and the ground level so that the brush is taken off the ground and held in the inoperative or transport position.

BACKGROUND OF THE INVENTION

The present invention also has the primary purpose of providing a lawn mowing and lawn brushing machine for golf course greens. However, in the present instance, the machine consists generally of a self-propelled tractor, a plurality of lawn mowers pivotally mounted on the tractor to be raised and lowered relative to the ground, and a lawn brushing means supported on the tractor and disposed in front of the mowers for brushing the grass.

It is a general object of this invention to provide an improved lawn mowing and brushing machine, and, more specifically, it is an object to provide a gang type lawn mower with lawn brushing means.

A further object of this invention is to provide a lawn mower and lawn brush machine wherein the mowers can be raised to a transport position, and, when the mowers are raised, the lawn brushing means is also raised along with the mowers. In accomplishing this object, the same lifting means used for lifting the lawn mowers is also used for lifting the brush means. Still further, there is a simple and easily mountable and de-mountable assembly of the lawn brush means relative to the tractor, and the lawn brush means is held in a secure position with the machine when the machine is in the transport condition.

Still a further object of this invention is to provide a lawn mower and lawn brush machine wherein the lawn brush means has an adjustable means which permits varying the force of the lawn brush means on the grass. That is, the adjustable means is adjustable to hold a selectable amount of the weight of the lawn brush means while permitting the remainder of the weight to be on the grass where the brushes are.

Still another object of this invention is to provide a lawn mower and lawn brush machine wherein a plurality of mowers are arranged across the machine, for cutting a wide swath in the grass, and the brushes are of substantially the same length as the swath but with the connection or mounting for the brushes on the tractor being suitable to accommodate having the brushes or brush means contact the grass with equal force on both ends of the brush means. To accomplish this object, the brush mounting or connector is arranged so that the brushes are self-adjusting to the ground for applying uniform force along the length of the brushes or brush means in brushing the grass.

Other objects and advantages will become apparent upon reading the following description in light of the accompanying drawings.

BRIEF DESCRIPTION OF DRAWINGS

FIG. 1 is a front perspective view of a machine of this invention.

FIG. 2 is a top plan view of a fragment of the machine in FIG. 1 showing the mounting structure for the mowers and brushes.

FIG. 3 is a sectional view taken along the line 3—3 of FIG. 2.

FIG. 4 is a sectional view taken along the line 4—4 of FIG. 2.

DETAILED DESCRIPTION OF THE PREFERRED EMBODIMENT

FIG. 1 shows the tractor, generally designated 10, three lawn mowers 11, and lawn brush means shown as three brushes 12 connected together in one unit along the bar 13 extending laterally of the fore-and-aft axis of the tractor 10. The brushes 12 are therefore in advance of the mowers 11, and the lengths of the mowers 11 are combined to be at least substantially the same as the total length of the three brushes 12. Thus the brushes 12 rest upon the ground and brush the grass, by means of the depending brush bristles 14, and the swath or width of the grass brushed is substantially the same as the swath cut by the three mowers 11. It will further be understood that the mowers 11 are arranged to have the two forward mowers 11 spaced apart, and the one rearward mower 11 is arranged to cut the space between the forward mowers 11. It will also be understood that the tractor 11 is supported on the ground by two wide wheels 16, at the front of the tractor, and a single wide wheel 17 at the rear of the tractor. The tractor is therefore three-wheeled, and the three mowers 11 are arranged to be immediately in front of each of the three wheels, respectively.

The tractor is further shown to include an engine 18, steering handle bars 19, and an operator's seat 21. The operator therefore rides on the tractor 10, and a foot platform 22 is provided for the operator. The tractor also includes a frame 23.

FIGS. 1 and 2 show that lift arms 24 and 26 are pivotally mounted on the tractor frame 23 by shafts 27 and 28, respectively, extending from the frame 23. Thus the arms 24 and 26 pivot up and down, and they have ends 29 and 31 extending in the fore-and-aft direction of the axis of the tractor. The pieces 29 and 31 in turn connect to the front mowers 11 through upright sleeves 32 and tubular members 33. Therefore, upon pivoting the arms 24 and 26 upwardly, the pieces 29 and 31 also pivot upwardly and carry the front mowers 11 upwardly. The front mowers 11 are therefore shown in the raised transport position since they are off the grass and above the level of the lower surface of the ground wheels 16 and 17. Any conventional lift mechanism can also be used for raising the rear mower 11, but that is no part of this invention nor does it have any relation to this invention.

The drawings further show that one suggested form of mechanism for pivoting the lift arms 24 and 26 is a hydraulic cylinder 34 which is suitably mounted on the tractor frame 23, and the cylinder ram 36 is suitably linked to shafts 37 which are rotatably mounted on the frame 23 and each carry a plate 38. Thus, upon actuation of the cylinder 34, the shafts 37 are rotated, in any manner of connecting the cylinder ram 36 and the shafts 37, and the plates 38 are then correspondingly pivoted or rotated about their axes of rotation on the shafts 37. The upper surfaces of the lift plates 38 then engage projections or rollers 39 on the backs of the lift arms 24 and 26, and this causes the arms to be lifted. This particular mechanism is no part of this invention and is therefore not required to be further detailed.

It will therefore be understood that the tractor and gang mowers described are particularly useful for mowing golf course greens, and the pressures of the mowers 11 and the tractor wheels 16 and 17 on the grass are minimal. Of course it will be further understood that grass catchers are used in connection with the mowers 11, and these catchers extend forwardly of the two forward mowers 11, and they occupy the position shown by the outline of the one catcher 41 in FIG. 2, and these catchers are mounted directly on the mowers 11, with the mounting being in any conventional and well-known manner.

The purposes of the present invention are to provide the lawn brush means on the gang mower and to have the brushes disposed for suitable brushing of the grass in advance of the mowers, and to accommodate the grass catchers 41, and to have the brushes self-adjusting end to end with respect to the force applied to the grass, and to have the brushes liftable to a transport position, and to have the brushes supported to apply only a selected amount of brushing force on the grass. Also, it is the purpose of this invention to have the brushes raised by the same power or means which raises the mowers, and to have the brushes held in the raised or transport position when the mowers are so raised.

The lawn brushing means includes the three brushes 12 connected to the common bar 13. A pusher 42 is also suitably connected to the bar 13 to hold the brushes 12 firmly and in a fixed position relative to the pusher 42 at the forward end of the pusher 42. The rearward end of the pusher 42 is received in a sleeve 43 which also receives a shaft 44 extending diametrically of the sleeve 43. Pivot blocks 46 and 47 are mounted on the tractor frame pins 27 and 28, respectively, and these blocks 46 and 47 pivotally support the shaft 44 for pivot or rotation of the shaft 44 about its longitudinal axis which is disposed transverse to the fore-and-aft axis of the tractor.

Therefore, with the portion of the lawn brushing means connector described, the brushes 12 can be pivoted up and down about the axis of the shaft 44. Also, a bolt or pin 48 extends through the sleeve 43 and the rear end of the pusher 42 to secure the pusher 42 with the sleeve 43. Pusher 42 and sleeve 43 have aligned holes therethrough for receiving the bolt 48, and one of the holes in one of the pieces is larger than the cross section of the bolt 48 so that the pusher 42 has some play or is pivotal about its longitudinal axis. That is, the opposite ends of the lawn brush means, as shown by the numerals 49 and 51, can be moved up and down relative to each other for adjusting to the ground when the pusher 42 rotates about its longitudinal axis, which rotation is permitted by the play between the pin 48 and the corresponding hole. FIG. 2 indicates that an enlarged hole 52 is provided in the sleeve 43 for permitting the play or rotation of the pusher 42 as mentioned.

The connector between the tractor 10 and the lawn brush means may also include a chain 53 and a tension spring 54. The upper ends 56 and 57 of the spring and chain respectively are suitably connected to a plate 58 on the tractor 10. The lower end 59 of the spring 54 is connected to the chain 53 by having the chain and the spring 54 hook onto a hook 63. As shown, two spaced apart chain legs 62 extend between hook 63 and hooks 61 on the bar 13, and this gives lateral balance or stability to the lawn brushing means shown. It will therefore be understood that the lower end 59 of the spring 54 can be hooked at any selected place along the chain legs 62, and such is possible by means of the S-hook 63 shown connecting the spring 54 and the chain legs 62. By varying the position of the hook 63 on the chain legs 62, the force applied by the spring 54 in supporting the weight of the brushes 12 is also variable, as desired. Thus the weight of the brushes 12 and the attached parts described can be held to a selected amount effective on the grass. Still further, the chain 53 can be taut to form one continuous and final length of chain with the chain legs 62 so that the brushes cannot be lowered below that final length, and this provides a limiter or restrictor for lowering the brushes, as desired.

A lifter 64 is connected to the pusher 42 by a standard 66, and the lifter 64 extends across the tractor 10 and is in the path of the mower lift arm portions 29 and 31. Thus the pieces 29 and 31 abut the lower edge of the lifter 64 when the mowers 11 are being raised. This causes the upwardly moving lift arms 29 and 31 to also raise the lifter 64 and to in turn raise the pusher 42 and the brushes 12.

Upon lowering the mowers 11, the arms 29 and 31 move below the lifter 64 when the brushes 12 come into contact with the grass, so the brushes 12 are no longer held upwardly by the arms 29 and 31. Ground wheels 67 are vertically adjustably mounted on the brush bar 13, as seen in FIG. 2, and they roll on the ground to hold some of the weight of the brush means, and allow the bristles 14 to engage the ground with only a desired force. Also, wheel adjustment allows for shortening of the bristles 14 through wear. For vertically adjusting the wheels 67, a bracket 68 is secured to the bar 13 and it supports a sleeve 69. An upright caster shaft 71 is attached to a yoke 72 rotatably supporting the wheel 67. The shaft 71 may be removed from the sleeve 69 by removing a pin 73, and washers 74 are then located above or below the sleeve 69, as desired, for the height adjustment. So, the wheels 67 could be used with or without the spring 54. Also, the chain 53 has a hook 76 for fastening onto the plate 58 to hold the brush means up, when it is desired to have the mowers lowered and to use the mowers without brushing.

What is claimed is:

1. In a combined lawn mower and lawn brush machine, a self-propelled mobile unit, lawn mowing means mounted on said unit and arranged for mowing in a path along the ground, a lawn brushing means supported through said unit and disposed in the path of and in advance of said mowing means for brushing the grass to be mowed by said mowing means, a connector between said unit and said lawn brushing means for liftably supporting said lawn brushing means relative to said unit, the improvement wherein said mobile unit is a self-propelled tractor, said lawn mowing means including three separate lawn mowers separately pivotally and removably disposed in staggered relation along said path for mowing in one wide swath of a width substantially the same as the total width of said three lawn mowers, said lawn brushing means being of a width substantially the same as the total width of said three lawn mowers, said connector including a first pivot connection with a pivot axis transverse to the fore-and-aft axis of said tractor and a second pivot connection with a pivot axis parallel to the fore-and-aft axis of said tractor and said lawn brushing means being pivotal about said axes for adjusting to uneven ground contour to thereby exert an equal pressure across said width of said lawn brushing means.

2. The combined lawn mower and lawn brush machine of claim 1, including lift means mounting said lawn mowers on said tractor for selectively raising said lawn mowers off the ground, a lifter connected with said lawn brushing means and responsive to the lifting of said lawn mowers for lifting said lawn brushing means along with the lifting of said lawn mowers.

3. The combined lawn mower and lawn brush machine of claim 2, wherein said ilfter includes a bar extending transversely of the fore-and-aft axis of said tractor and being in the path of lift of said lawn mowers to be lifted along with the raising of said lawn mowers for upwardly pivoting said lawn brushing means and thereby rendering said second pivot axis ineffective.

4. The combined lawn mower and lawn brush machine of claim 1, including a variable-force weight-supporting means connected between said tractor and said lawn brushing means for supporting a selected amount of the weight of said lawn brushing means to effect selective downward force of said lawn brushing means on the ground.

5. The combined lawn mower and lawn brush machine of claim 4, including a supporter selectively operative between said lawn brushing means and said tractor and effective to render said variable-force weight-supporting means inoperative to thereby securely hold said lawn brushing means in a raised position off the ground.

6. The combined lawn mower and lawn brush machine of claim 1, wherein said connector includes a pusher pivotally mounted at one end thereof on said tractor for up and down movement and extending forwardly of said lawn mowers and with the other end of said pusher connected to said lawn brushing means, and a sleeve and shaft telescopically connected at said pivotally mounted end for ready mounting and release of said pusher and said lawn brushing means.

7. The combined lawn mower and lawn brush machine of claim 1, wherein said connector includes a pusher pivotally mounted at one end thereof on said tractor for up and down movement and extending forwardly of said lawn mowers and with the other end of said pusher connected to said lawn brushing means, and a lifter connected with said pusher intermediate said ends of said pusher and responsive to the lifting of said lawn mowers for pivoting said pusher and said lawn brushing means to lift the lawn brushing means in response to the lifting of said lawn mowers.

8. The combined lawn mower and lawn brush machine of claim 7, wherein said connector includes a tension spring and a chain with said pivotally mounted end of said connector attached to said tractor at a level above that of said lawn brushing means to depend down to the latter, said spring and said chain being end-to-end connected together and presenting one continuous and effective length of said spring and said chain extending between said tractor and said lawn brushing means, and releasable connectors operative on the effective length of said chain for altering the lifting force exerted by said spring on said lawn brushing means.

9. The combined lawn mower and lawn brush machine of claim 1, including lift arms pivotally mounted on said tractor and connected to said lawn mowers, said connector including a piece pivotally mounted on said tractor and supporting said lawn mowers, a lifter connected to said connector and extending into the pivotal paths of said lift arms to be raised in response to the raising of said lift arms for upwardly pivoting said connector and said lawn brushing means to raise the latter off the ground, and said connector including a supporter secured to said tractor for holding said lawn brushing means off the ground.

10. The combined lawn mower and lawn brush machine of claim 1, wherein said mowers are disposed with two mowers abreast and spaced apart, a grass catcher for each of said mowers disposed in advance of said mowers, a pusher included in said connector and pivotally mounted at one end on said tractor and extending between said two mowers to a position forwardly of said catchers with the forward end of said pusher being connected to said lawn brushing means for the liftable support of the latter.

11. The combined lawn mower and lawn brush machine of claim 1, including ground engaging means connected with said lawn brushing means for supporting the latter.

12. The combined lawn mower and lawn brush machine of claim 11, including a vertically adjustable mounting for said ground engaging means on said lawn brushing means for setting the elevation of said lawn brushing means relative to the ground and thereby set the force exerted by said lawn brushing means on the ground.

13. In a combined lawn mower and lawn brush machine, a self-propelled mobile unit, lawn mowing means mounted on said unit and arranged for mowing in a path along the ground, a lawn brushing means supported through said unit and disposed in the path of and in advance of said mowing means for brushing the grass to be mowed by said mowing means, a connector between said unit and said lawn brushing means for liftably supporting said lawn brushing means relative to said unit, the improvement wherein said mobile unit is a self-propelled tractor, said lawn mowing means including three separate lawn mowers separately pivotally and removably disposed in staggered relation along said path for mowing in one wide swath of a width substantially the same as the total width of said three lawn mowers, said lawn brushing means being of a width substantially the same as the total width of said three lawn mowers, a limited motion connector effective between said lawn brushing means and said tractor for up and down movement of the opposite ends of said lawn brushing means so that said lawn brushing means can adjust to uneven ground contour to thereby exert an equal force across the entire width of said lawn brushing means, said limited motion connector including limits for holding said lawn brushing means against said up and down movement so that said lawn brushing means is held substantially horizontal relative to the ground when said lawn brushing means are in the lifted position.

14. In a combined lawn mower and lawn brush machine, a self-propelled mobile unit, lawn mowing means mounted on said unit and arranged for mowing in a path along the ground, a lawn brushing means supported through said unit and disposed in the path of and in advance of said mowing means for brushing the grass to be mowed by said mowing means, a connector between said unit and said lawn brushing means for liftably supporting said lawn brushing means relative to said unit, the improvement wherein said mobile unit is a self-propelled tractor, said lawn mowing means including three separate lawn mowers separately pivotally and removably disposed in staggered relation along said path for mowing in one wide swath of a width substantially the same as the total width of said three lawn mowers, said lawn brushing means being of a width substantially the same as the total width of said three lawn mowers, said connector having one end attached to said tractor and including a variable-force weight-supporting means for supporting the weight of said lawn brushing means to effect selective downward force of said lawn brushing means on the ground.

15. The combined lawn mower and lawn brush machine of claim 14, wherein said connector includes a pivot means having an axis transverse to the fore-and-aft axis of said tractor for pivotally mounting said lawn brushing means on said tractor.

References Cited

UNITED STATES PATENTS

| | | | |
|---|---|---|---|
| 1,757,844 | 5/1930 | Pol. | |
| 1,994,929 | 3/1935 | Stegeman | 56—7 |
| 3,472,005 | 10/1969 | Profenna | 56—7 |

FOREIGN PATENTS

| | | |
|---|---|---|
| 170,952 | 11/1921 | Great Britain. |
| 531,207 | 12/1940 | Great Britain. |
| 531,786 | 1/1941 | Great Britain. |

LOUIS G. MANCENE, Primary Examiner

J. A. OLIFF, Assistant Examiner